United States Patent [19]

Herz et al.

[11] Patent Number: 4,897,842
[45] Date of Patent: Jan. 30, 1990

[54] INTEGRATED CIRCUIT SIGNATURE ANALYZER FOR TESTING DIGITAL CIRCUITRY

[75] Inventors: William S. Herz, Sunnyvale; Robert A. Williams, Redwood City, both of Calif.

[73] Assignee: Ampex Corporation, Redwood City, Calif.

[21] Appl. No.: 117,772

[22] Filed: Nov. 5, 1987

[51] Int. Cl.[4] .......................................... G01R 31/28
[52] U.S. Cl. ..................................... 371/22.4; 371/61
[58] Field of Search ................. 371/25, 61; 324/73 R, 324/73 AT, 73 PC

[56] References Cited

U.S. PATENT DOCUMENTS

| | | | |
|---|---|---|---|
| 3,976,864 | 8/1976 | Gordon et al. | 235/153 |
| 4,192,451 | 3/1980 | Swerling et al. | 371/20 |
| 4,216,374 | 8/1980 | Lam et al. | 371/27 |
| 4,329,640 | 5/1982 | Reiner et al. | 324/73 |
| 4,498,174 | 2/1985 | Le Gresley | 371/25 |
| 4,503,536 | 3/1985 | Panzer | 371/25 |
| 4,503,537 | 3/1985 | McAnney | 371/25 |
| 4,510,572 | 4/1985 | Reece et al. | 364/489 |
| 4,513,418 | 4/1985 | Bardell, Jr. et al. | 371/25 |
| 4,519,078 | 5/1985 | Komonytsky | 371/25 |
| 4,534,030 | 8/1985 | Paez et al. | 371/25 |
| 4,594,544 | 6/1986 | Necoechea | 324/73 |
| 4,594,711 | 6/1986 | Thatte | 371/25 |
| 4,598,401 | 7/1986 | Whelan | 371/25 |
| 4,647,846 | 3/1987 | Malkin | 371/25 |

FOREIGN PATENT DOCUMENTS 2164474A 3/1986 United Kingdom.

OTHER PUBLICATIONS

Konemann et al., Built-In Test for Complex Digital Integrated Circuits, Fifth European Solid State Circuits Conf., Sept. 18-21, 1979, pp. 89-90.

Bhavar et al., Self-Testing by Polynomial Division, Digest of Papers, 1981 Intl. Test Conference, IEEE, pp. 208-216.

Application Note 222, "A Designer's Guide to Signature Analysis", Hewlett-Packard, Oct. 1980.

Application Note 222-2, "Application Articles on Signature Analysis", Hewlett-Packard, May 1979.

*Primary Examiner*—Charles E. Atkinson
*Attorney, Agent, or Firm*—Robert E. Krebs; Richard P. Lange

[57] ABSTRACT

A system for testing digital circuitry includes a signature generator that is connected to a plurality of nodes in the circuit to be tested and that generates signature words unique to identical streams of binary data signals or clocking signals. A multiplexer sequentially directs streams of signals to the signature generator from selected test nodes, or data streams from a plurality of nodes can be signaturized simultaneously.

13 Claims, 6 Drawing Sheets

INTEGRATED CIRCUIT SIGNATURE ANALYZER FOR TESTING DIGITAL CIRCUITRY

TECHNICAL FIELD

The present invention generally relates to systems for testing digital circuitry and, more particularly, to test systems that uniquely identify streams of digital signals at circuit nodes.

STATE OF THE ART

In microprocessor-based circuitry using bus architecture, it is often difficult for technicians to determine if the circuitry is operating properly and to trouble-shoot faults. In part, the difficulties arise because of the complex data streams generated by microprocessors and other digital circuit elements. To reduce such difficulties, workers in the art have developed so-called "data compression" techniques. Generally speaking, these techniques employ algorithms to uniquely characterize streams of binary signals at selected nodes during test periods. In one relatively simple data compression technique, for example, changes in binary logic levels of data signals at a node are counted during a test period. The transition count is then compared to the number of data transitions that are expected to occur at the same node of a properly operating circuit over the test period; if there are differences between the actual and expected transition counts, a technician can conclude that there are faults in the circuit elements connected to the test node.

Another data-compression technique, sometimes called "signature analysis," is described in U.S. Pat. No. 3,976,864. According to this patent, an algorithm circuit generates "signature words" from streams of binary signals during test periods. Generally speaking, the algorithm can be classified as a cyclical redundancy check or as a pseudo-random number algorithm. The signature words uniquely characterize the respective data streams and are typically generated by conveying streams of binary data from a test node to a multi-bit shift register. In such an application, a 16-bit shift register, for example, will provide over sixty thousand unique signature words. The large number of possible signature words using such a shift register allows the algorithm to function with a high probability of producing a unique signature word for each tested node. In practice, the contents of the shift register are often encoded in hexadecimal (i.e., alphanumeric) form to summarize an otherwise cumbersome representation, and the encoded words are subsequently used for data stream testing and analysis.

Typically, data stream analysis at nodes of microprocessor-based circuitry is most satisfactory when elements of the tested circuitry are "exercised" or "stimulated" to provide repetitious streams of binary signals at the test nodes. Such stimulation can be provided by, for example, pattern generators. In conventional signature analysis, signature words obtained from nodes of properly operating circuits during exercise periods are compiled for later use by technicians when testing similar circuits. Ordinarily, compilation of the signatures is time-consuming and provides opportunities for error.

Several portable test instruments have been developed to perform signature analysis on digital circuits. One such instrument is the Hewlett-Packard 5004A Signature Analyzer. To use the instruments, a technician must first identify a particular node in a circuit, must assure himself that signals at the node are under the control of a suitable test program, must manually connect a probe to the node, and then must operate the analysis instrument to obtain a signature word for a stream of signals at the node. After obtaining a signature word at the test node, the technician usually compares the signature word to annotations on a circuit board layout or to a reference list that provides signature words for properly operating test nodes in the circuit. To test signal conditions at a second node, the technician must manually move the probe to the second node and repeat the signaturizing procedure. For multi-node analysis, such procedures are time-consuming and provide numerous opportunities for errors.

U.S. Pat. No. 3,976,864 also suggests that a signal generator can be triggered to generate a signature of a signal stream at a node from a parallel bit stream, i.e., from a digital signal that is available in multi-bit form. While such a technique may increase the flexibility of signature analysis instrument, the technique does not appear to overcome the difficulties and shortcomings of manual multi-node analyses.

Still further, U.S. Pat. No. 3,976,864 states that a signature analysis instrument can be used to locate intermittent faults in a digital circuit. More particularly, the patent suggests that consecutively-derived signatures can be stored and then compared in a comparator that indicates whether the signatures are different. If a signature generated for a given period of operation of the circuit under test differs from the signature generated for the preceding period, the analysis instrument latches on the changed signature and stops, thereby signaling that a change has taken place and indicating that the circuit is unstable. Further according to the patent, annunciators can be connected to the comparator to indicate instances when binary data is stuck at logic levels of one or zero.

To reduce the time required for testing and to minimize technician errors, U.S. Pat. No. 4,510,572 suggests that a signature analysis instrument can include a memory programmed with signature words that occur at all test nodes of a correctly-operating circuit of the kind being tested. According to this patent, comparisons are made of the signature word that is obtained by manually probing a node of a circuit under test with all of the signature words in memory; if a match is found, a technician can imply that the match relates to the node under test and can use the information as an indication that the circuitry is operating correctly at the test node.

It is also suggested in U.S. Pat. No. 4,510,572 that a signature analysis instrument can be constructed to count data transitions in streams of binary signals at particular nodes. According to the patent, data transition counts attained through use of the analysis instrument are automatically compared to all other counts stored in a memory. The stored transition counts represent all counts at all nodes when the tested circuitry is correctly operating. If a match is found with stored transition counts, such information provides another indication that the node under test is probably operating satisfactorily.

U.S. Pat. No. 4,510,572 also suggests that comparators can be used to compare consecutive signature words or consecutive transition counts at a given node of a circuit being tested. If two consecutive signature words or transition counts do not match, this indicates that conditions at the test node are unstable. According to the patent, a signature word or transition count that immediately preceeds an indication of instability will be latched for later reference.

In view of the preceding discussion, it can be appreciated that there have been various advancements in the art of testing digital electronic circuits by data compression techniques including signature analysis, but that manual probing is still inherent in such techniques. Further, it can be appreciated that manual probing of circuits is difficult, time-consuming and affords numerous possibilities for error. Thus, there exists a need for further improvements in processes and systems for detecting errors in digital electronic circuitry.

SUMMARY OF THE INVENTION AND OBJECTS

A primary object of the present invention is to provide a system for automated testing of digital electronic circuitry by data compression techniques, such as signature analysis, without the necessity of manual probing.

In one embodiment, the present invention provides a system for interactively testing digital electronic circuitry and generally includes (a) generator means connected to a plurality of nodes of digital circuitry for generating words that are unique to streams of binary signals at the nodes, and (b) comparator means for comparing signature words generated by the generator means with stored signature words. In practice, the stored signature words can be ones obtained from the nodes of a correctly operating circuit of the same kind as the one under test or can be obtained from the circuit under test itself during a prior operating cycle. Also, in a particular embodiment, the testing system provides an indication, in real time, of whether consecutively-generated signature words are identical.

In another embodiment, the present invention provides a system for detecting the stability and correctness of clocking intervals at the nodes of digital electronic circuitry. The system in this embodiment generally includes a generator for generating signature words unique to the number of edges in streams of clock signals, a comparator for comparing generated signature words with stored signature words for correctness, and a second comparator for indicating whether consecutively-generated signature words are identical and, therefore, stable.

Among the advantages of the present invention is the provision of test systems that operate under software control and that automatically analyze information from a plurality of nodes in digital electronic circuitry through data compression techniques. For example, in one embodiment, the test system can simultaneously analyze data streams from sixteen or more circuit nodes without manual probing. Moreover, the systems include means to select the duration of test intervals depending upon the node, or nodes, being tested.

It is also advantageous that the systems of the invention provide several diagnostics for each circuit tested. The diagnostics include data stream signature verification, real-time data stability checks, clock interval verification, and clock interval stability checks. It should be appreciated that the capability of testing signal conditions with two or more diagnostic tests greatly aids in isolating and identifying circuit faults in digital electronic circuitry.

Additional objects and advantages of the present invention can be ascertained by reference to the following description and attached drawings which illustrate preferred embodiments of the present invention.

DETAILED DESCRIPTION OF THE PREFERRED EMBODIMENT

Figure 1:
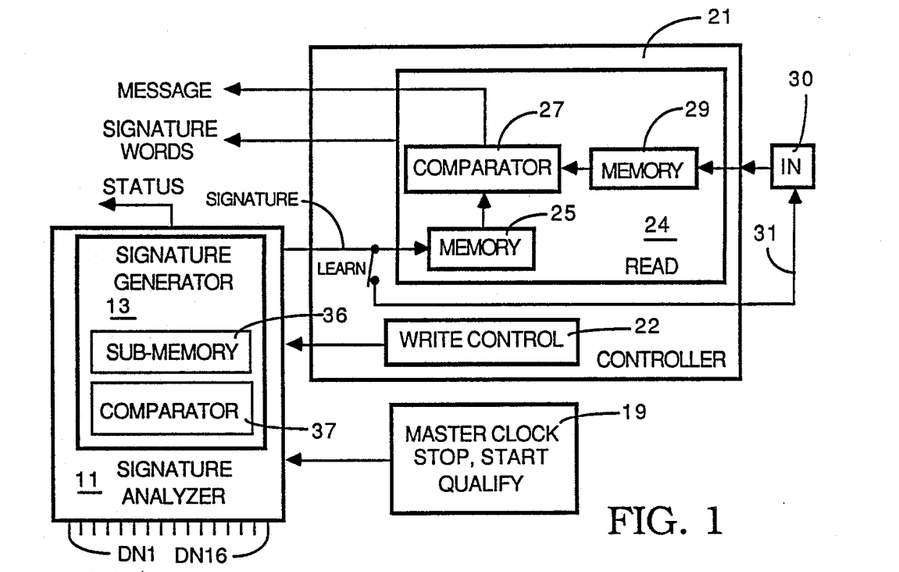
FIG. 1 is a generalized functional diagram of a system according to the present invention for signaturizing binary data at the nodes of a digital electronic circuit.

FIG. 1 generally illustrates a system for interactively testing digital circuits including integrated circuits. In practice, the test system itself includes an integrated circuit 11 that is mounted on a board which contains circuit components to be tested. Generally speaking, circuit 11 can be referred to as a signature analyzer and includes a signature generator 13 having a sub-memory which is at least one level deep, a comparator, and other components as will be described hereinafter. Signature analyzer 11 is connected to input lines, designated DN1–DN16, that are hard-wired to selected data nodes of circuits to be tested. Also, signature analyzer 11 is connected to a control circuit 19 that generates master clock pulses which synchronize operation of signature generator 13 with other circuits. Control circuit 19 also generates signals such as START, STOP and QUALIFY that define the test cycles or periods. Signature generator 13 also is connected to provide status bytes so that STATUS signals can be displayed. Finally, signature generator 13 is interactively connected to a microprocessor-based controller 21.

Controller 21 is normally a microcomputer that provides software control and access to signature analyzer 11. The controller has conventional functions including a write control section 22 and a read control section 24. Write control 22 provides digital instructions to signature analyzer 11. Read control 24 receives digital data from the analyzer. In practice, communications between microprocessor-based controller 21 and signature analyzer 11 are via an eight-bit wide, bi-directional data bus having two address lines as well as a read/write and chip-enable line. The data bus allows the system to selectively provide, for example, STATUS messages concerning the status of a particular signature.

Microprocessor-based controller 21 is also connected to control circuits to be tested so that the circuits are stimulated in a manner that facilitates data-compression analysis at data nodes of the circuits. Suitable programs for this purpose are described, for example, in "A Designer's Guide to Signature Analysis", Hewlett-Packard Corp., 1980. A conventional data input device 30 is connected to enter such programs and other instructions to controller 21. Also, input device 30 can receive information from signature generator 30 as indicated by line 31.

As also shown in FIG. 1, controller read section 24 includes a memory 25 which stores signature words provided by signature generator 13. The output of memory 25 is provided to a comparator 27 which receives signature words from a second memory 29. The two memories 25 and 29 need not be separate, but are shown as such to emphasize that their contents are normally different and that comparator 27 compares data from the two memories to produce output messages. Information stored in second memory 29 is normally provided from input device 30.

Operation of signature generator 13 of FIG. 1 will now be described for a serial mode of testing data streams from a plurality of circuit nodes. An initial step in the serial testing mode is to operate controller 21 to stimulate circuits whose nodes are to be tested. In other words, the initial step is to activate a pattern generator or other means that excercizes the circuits to be tested. While the circuits are executing prescribed routines, signature generator 13 sequentially receives binary signals from the selected data nodes to which input lines DN1 through DN16 are connected. In practice, technicians can use controller 21 to specify the nodes to be tested and the number of test iterations. For example, signature generator 13 can be operated to first receive a stream of binary signals from a data node connected to input line DN1, then to receive a stream of binary signals from a data node connected to input line DN2, and so forth for all of the active input lines. (A multiplexer for providing such sequences of input signals will be described in connection with FIG. 2.) Test cycles for the selected nodes are determined by the control signals START, STOP and QUALIFY from control circuit 19.

Upon receiving a stream of binary data signals from a selected given node during a given test cycle, signature generator 13 generates a signature word. After each signature word is generated, it is transferred to memory 25 and can be displayed as a SIGNATURE WORD output from the system. Then, both memory 25 and second memory 29 provide signature words to comparator 27 for comparison. Preferably, the signature words in memory 29 are indexed by node so that, for a given test node, the only signature word retrieved from memory 29 is the one indexed for that node. Signature words stored in second memory 29 are normally generated from nodes of a circuit which is the same as the one under test but known to be properly operating. Such signature words are entered into second memory 29 through input device 30 from an external source. After comparator 27 compares signature words, output MESSAGE signals from comparator 27 indicate whether the signature words are correct, i.e., whether signature words derived from data streams at the test node are identical to stored signature words that are, for example, derived from data streams at a corresponding node of a properly operating circuit. In practice, the MESSAGE, STATUS, and SIGNATURE WORD outputs can be displayed on a CRT screen or the like.

Alternatively, the system of FIG. 1 can operate in a mode where the signature words stored in second memory 29 are generated from nodes of the circuit under test. In that case, signature words stored by second memory 29 are generated by signature generator 13 and are sent to second memory 29 for storage via line 31 and input device 30. This mode of operation can be called a "learn" mode because the standards for analysis, namely, the signature words and other information stored in second memory 29, are generated by the test circuit itself.

In normal operation of read section 24 of the system of FIG. 1, not every word generated by signature generator 13 is compared with signature words stored in second memory 29 but only samples of the generated signature words. Such sampling can be described as being a periodic and results from the fact that the rate at which signature words are generated is usually substantially greater than the rate at which read control section 24 is able to obtain signatures for comparison. Because the ratio of the number of comparisons to the number of signature words generated during test cycles can vary widely, depending upon the test node, aperiodic sampling is not always satisfactory to determine whether data streams at a tested node are stable in real time.

Figure 2:
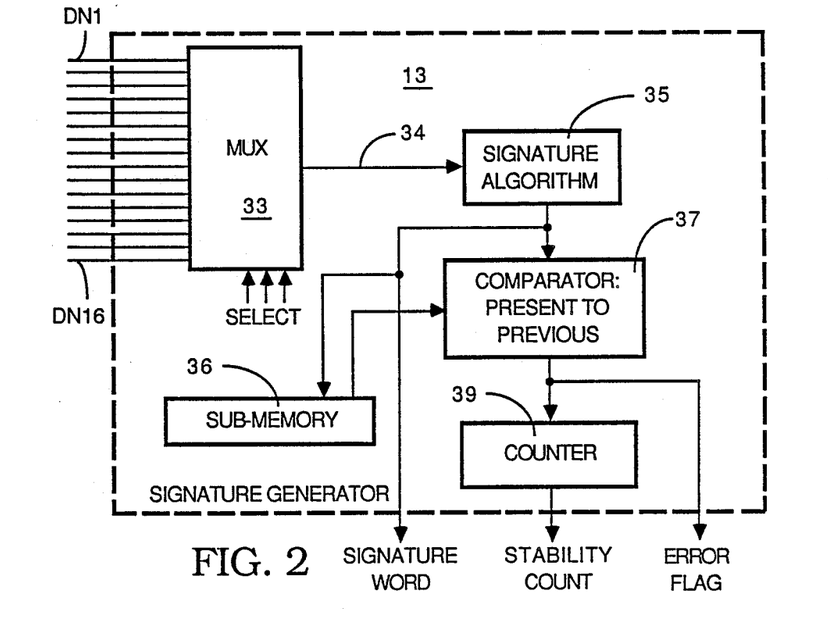
FIG. 2 is a functional diagram of a portion of the system of FIG. 1.

A system to provide information on data stream stability in real time is shown in FIG. 2. In the illustrated embodiment, signature generator 13 includes a multiplexer 33, a signature algorithm circuit 35, a sub-memory 36, a comparator 37, and a counter 39. (The sub-memory 36 and comparator 37 are also shown in FIG. 1.) Multiplexer 33 is connected to receive data on input lines DN1–DN16 and includes a single output line 34. In operation, multiplexer 33 acts as a selector to select the data streams from the test nodes in a predetermined sequence; for example, the first input line selected may be input line DN1, the second input line selected may be DN2, and so forth for each of the lines DN1–DN16. The order in which input lines are selected and the timing of transitions from one input line to another are determined by SELECT signals from controller 21 synchronized with STOP, START and QUALIFY signals. Because of its function, multiplexer 33 can also be referred to as a line selector.

Upon receiving a stream of data signals from a given node as determined by multiplexer 33, signature algorithm circuit 35 of FIG. 2 generates a SIGNATURE WORD signal that uniquely characterizes the signal stream. For checking the stability of generated signature words, the output of signature algorithm circuit 35 of FIG. 2 is connected to sub-memory 36 and to comparator 37. Also, the output of sub-memory 36 is connected to comparator 37, and the output of the comparator is connected to counter 39. In operation, sub-memory 36 stores only a single signature word and, upon receiving a subsequent signature word, sends the previously-stored word to comparator 37. Comparator 37 then compares consecutive signature words and its output indicates whether consecutive signature words are identical. Thus, in the illustrated embodiment, an ERROR FLAG signal is generated from comparator 37 to indicate the occurrence of non-identical consecutive signature words. (A logic circuit, not shown, is provided so that the first signature word is compared only with itself, and therefore, an ERROR FLAG signal is not provided when the first signature word is generated at a given node.) Output signals from comparator 37 are also provided to counter 39 which count off consecutively-stable signature words in real time during the test intervals and provides a STABILITY COUNT signal. Thus, the STATUS signals from the system in FIG. 1 can include STABILITY COUNT and ERROR FLAG signals as well as other status information.

Signature algorithm circuit 35 in FIG. 2 is a pseudo-random number generator which operates such that each bit of data in an input stream is combined with other bits representing the present digital state of the generator. Preferably, algorithm circuit 35 is implemented as a sixteen-stage linear shift register with feedback. For serially signaturizing data, a suitable algorithm circuit is described, for example, in "Hexadecimal Signatures Identify Troublespots in Microprocessor Systems", *Electronics. Mar.* 3, 1977. However, signature algorithm circuit 35 can also operate in a parallel mode, i.e., to signaturize data from a plurality of test nodes simultaneously. For parallel mode operation, a suitable embodiment of algorithm circuit 35 is shown in FIG. 3.

Figure 3:
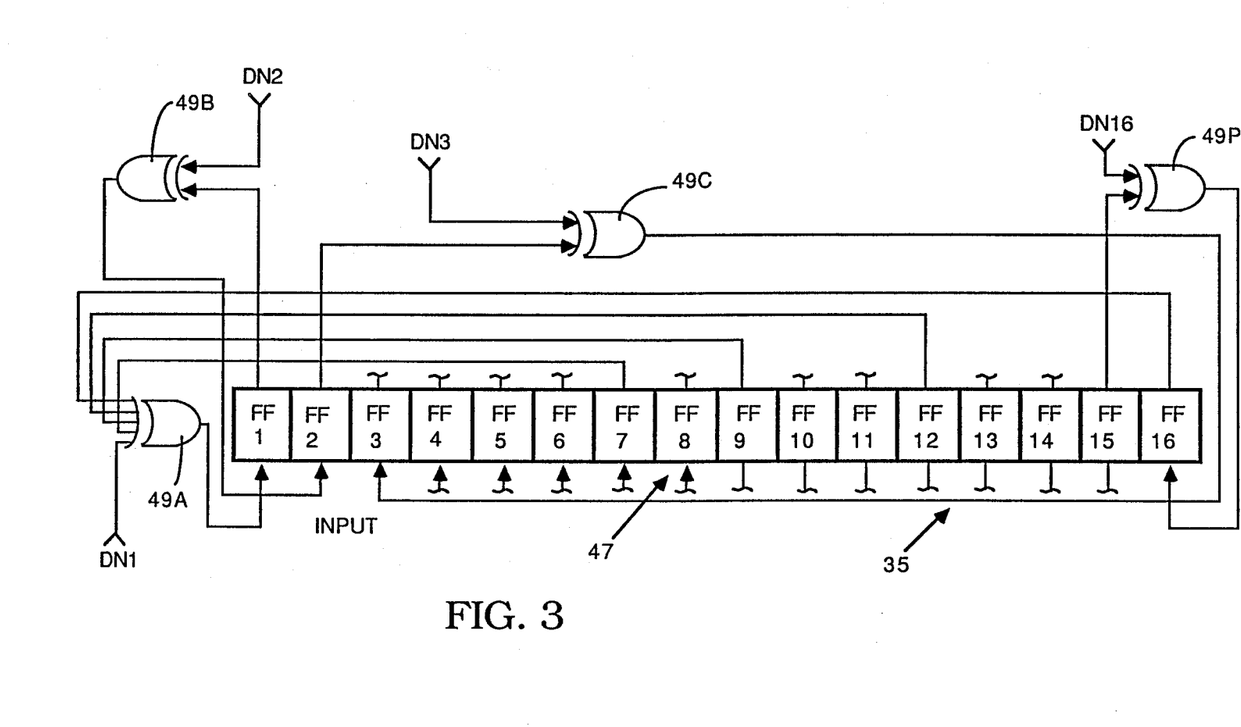
FIG. 3 is a schematic diagram of a data-compression algorithm for use in the system of FIGS. 1 and 2.

In FIG. 3, a multi-bit shift-register 47 is comprised of stages defined by a series of flip-flops FF1 through FF16. The flip-flops are conventionally arranged such that the output of one flip-flop drives the input of the next. The input to the first stage of shift register 47 (i.e., the input to flip-flop FF1) is provided by an exclusive OR gate $49_A$. In turn, the inputs to exclusive OR gate $49_A$ are signals on input line DN1 and feedback signals from subsequent stages of shift register 47. In the illustrated example, feedback to OR gate $49_A$ is from shift-register stages FF7, FF9, FF12 and FF16; however, feedback from different ones of the stages can be used if the feedback pattern is pseudo-random.

As further shown in FIG. 3, an output of first flip-flop FF1 is connected to the input of a second exclusive OR gate $49_B$. The other input to gate $49_B$ is data input line DN2. The output of exclusive OR gate $49_B$ is connected to second flip-flop FF2. Likewise, the output of second flip-flop FF2 is connected to the input of third exclusive OR gate $49_C$ whose other input is line DN3. The output of gate $49_C$ is connected to flip-flop FF3. This pattern is continued until, finally, the output of flip-flop FF15 is connected to the input of an exclusive OR gate $49_P$ whose other input is data line DN16, and the output of OR gate $49_P$ is connected to final flip-flop FF16. To avoid unduly complicating the drawing of FIG. 3, the connections to intermediate flip-flops FF4 through FF15 are not shown.

Operation of signature algorithm circuit 35 of FIG. 3 to signaturize streams of binary data from a plurality of test nodes simultaneously can now be understood. To initiate operation in this "parallel" mode, the contents of shift register 47 are cleared and then, with lines DN1 through DN16 connected to nodes selected for testing, data from those nodes are simultaneously fed to exclusive OR gates $49_A$ through $49_P$, respectively. Outputs from exclusive OR gates $49_A$ through $49_P$ depend, by definition, upon the states of the inputs; thus, the state of each stage in shift-register 47 is determined by the preceding stage, the feedback pattern, and the signals on input lines DN1-DN16. Upon expiration of a predetermined test cycle, the simultaneous inputs of data produce a sequence of binary bits (i.e., a signature word) in shift register 47. If exactly the same input streams are present during a subsequent test cycle, the same signature word will be generated and, otherwise, the signature word will be different. Typically, analysis will begin with parallel mode and, if signatures are identified as being incorrect or unstable, serial analysis can be used to isolate the circuit fault.

It should be understood that signature algorithm circuit 35 of FIG. 3 can signaturize binary signal streams simultaneously from any number of test nodes less than or equal to the number of stages of the shift-register employed in the algorithm circuit. For example, if signal streams from twelve nodes are to be simultaneously signaturized, input lines DN1 through DN12 would be active and lines DN13 through DN16 would be inactive. As another example, input lines DN1 through DN4 and DN16 could be inactive, and signal streams signaturized simultaneously from eleven nodes connected to input lines DN5 through DN15, respectively. (Selection of the nodes to be tested is, in practice, determined by controller 21 of FIG. 1.) In the minimal case, signature algorithm circuit 35 can generate a signature word from a stream of signals originating only from single data node; in that case, all but one of the input lines DN1-DN16 would be inactive.

Also, signature algorithm circuit 35 of FIG. 3 can be readily modified to signaturize signal streams from a greater number of test nodes than there are stages to shift-register 47. Circuit components to accomplish this modification are shown in FIG. 4, wherein elements common to the previously-described embodiment are labelled with the same reference numbers.

Figure 4:
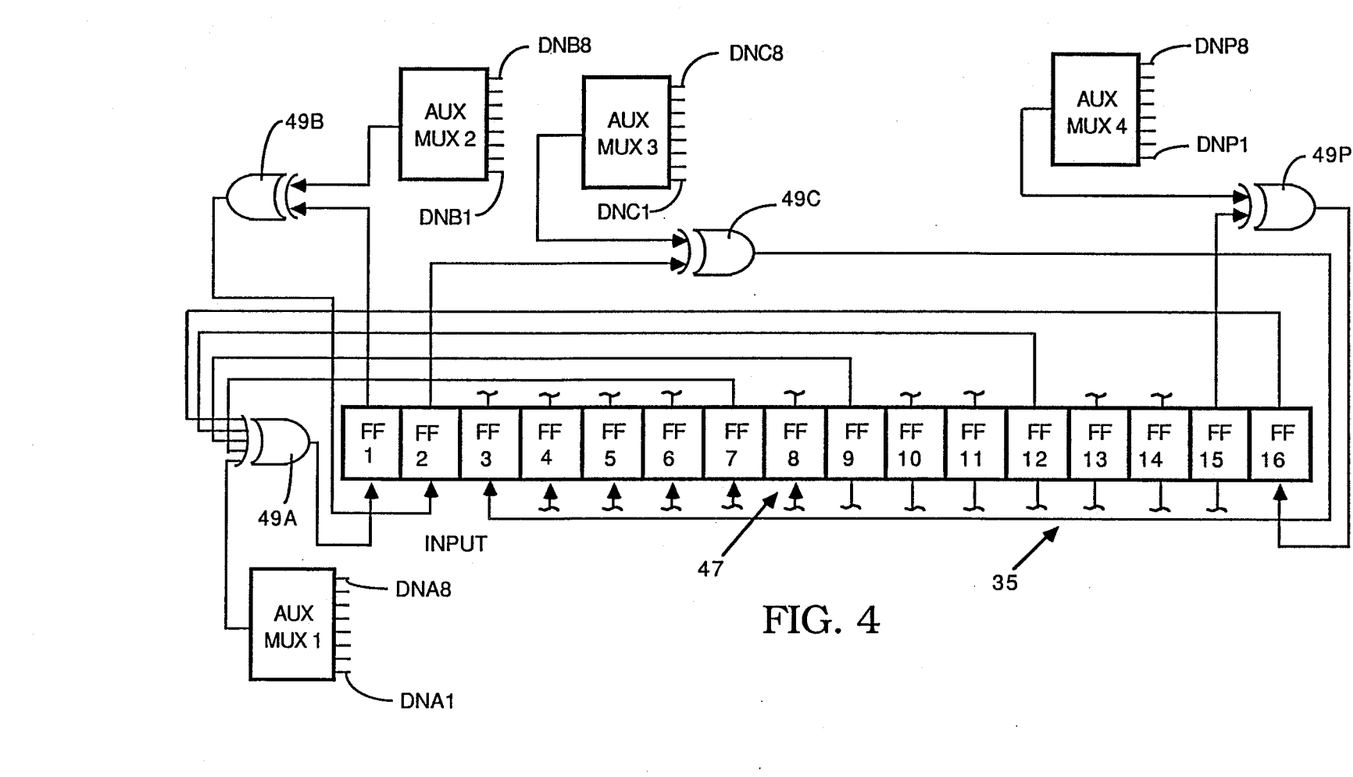
FIG. 4 is a schematic diagram of an alternative embodiment of the data compression algorithm of FIG. 3.

In the circuitry shown in FIG. 4, expansion of signature algorithm circuit 35 is accomplished by connecting auxiliary multiplexers AUX MUX1 through AUX MUX16 to the input lines to exclusive OR gates 49A-P, respectively. In practice, each of the sixteen auxiliary multiplexers has eight input lines, thereby permitting access to 128 (16 x 8) data nodes. (To avoid unduly complicating the drawing, only auxiliary multiplexers AUX MUX1-3 and AUX MUX16 are shown.) In FIG. 4, input lines to the respective auxiliary multiplexers are designated DNA1-DNA8, DNB1-DNB8, and so forth through DNP1-DNP8. The number of data nodes actually accessed by the system of FIG. 4 is often less than the total possible. For example, if data streams from forty-eight test nodes are to be signaturized with shift register 47 having sixteen stages, sets of input lines from three different nodes would be connected to each of sixteen auxiliary multiplexers, AUX MUX1 through AUX MUX16. In operation, according to this example, auxiliary multiplexers AUX MUX1 through AUX MUX16 synchronously select the input lines serially. For example, during a first testing cycle, a first input line to each of the multiplexers AUX MUX1 through AUX MUX16 would be selected; in the next testing cycle, a second input line to each of the sixteen multiplexers would be selected and, in the following cycle, the third input line to the multiplexers would be selected. Thus, in this example, signal streams from a first group of sixteen nodes (e.g., nodes DNA1, DNB1, . . . DNP1) would be signaturized simultaneously during the first test cycle, then signal streams from a second group of sixteen data nodes (e.g., nodes DNA2, DNB2, . . . DNP2) would be signaturized during the second cycle and, finally, signature streams from a third group of sixteen data nodes (e.g., DNA3, DNB3, . . . DNP3) would be signaturized during the third cycle. Signature words generated for each group of selected data nodes during such an expanded mode of operation can be compared to other signature words for correctness, or consecutively-generated signature words for each group can be compared to determine stability. In the event that a signature word generated in the expanded mode is found to be incorrect, or if two consecutively-generated signature words for the same group are different, faulty nodes can be isolated. Normally, isolation of circuit faults is accomplished by successive multi-node analysis of smaller groups of nodes or by serial analysis of each of the tested nodes.

Figure 5:
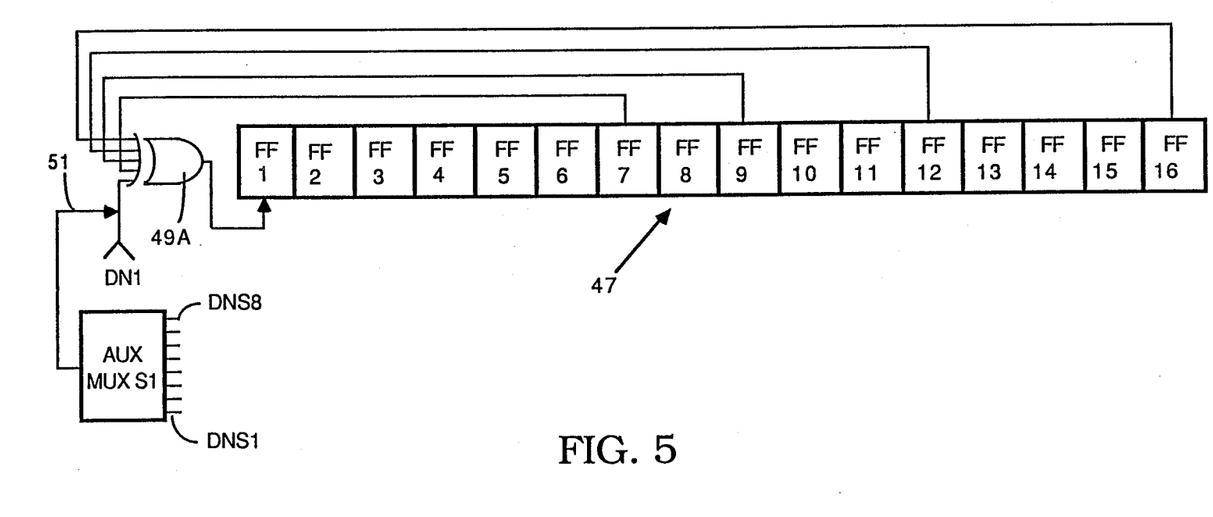
FIG. 5 is a schematic diagram of yet another embodiment of the data compression algorithm of FIG. 3.

It should also be understood that signature algorithm circuit 35 of FIG. 3 can also be readily modified to operate in the serial mode as well as the parallel mode. Circuit components to accomplish this modification are shown in FIG. 5, wherein elements common to the previously-described embodiment are labelled with the same reference numbers. In the serial mode, the exclusive OR gates 49$_B$-49$_P$ are bypassed while maintaining the same feedback lines to exclusive OR gate 49A. Also, in the serial mode, data input lines from the test nodes are connected to a multiplexer AUX MUX S1 whose output line is, in turn, connected to the input path of a data node. For example, data input lines DNS1 through DNS8 can be connected to auxiliary multiplexer AUX MUX S1 whose output line 51 is connected to the exclusive path ordinarily used for data node DN1.

In operation of auxiliary multiplexer AUX MUX S1 in the system of FIG. 5, input lines DNS1 through DNS8 are sequentially selected in a predetermined serial order. After each of the input lines is selected, signature algorithm circuit 35 generates a signature word from the streams of data provided on the input line. Following each generation, the generated signature word is employed to identify circuit faults in the manner described for the systems of FIGS. 1 and 2.

Figure 6:
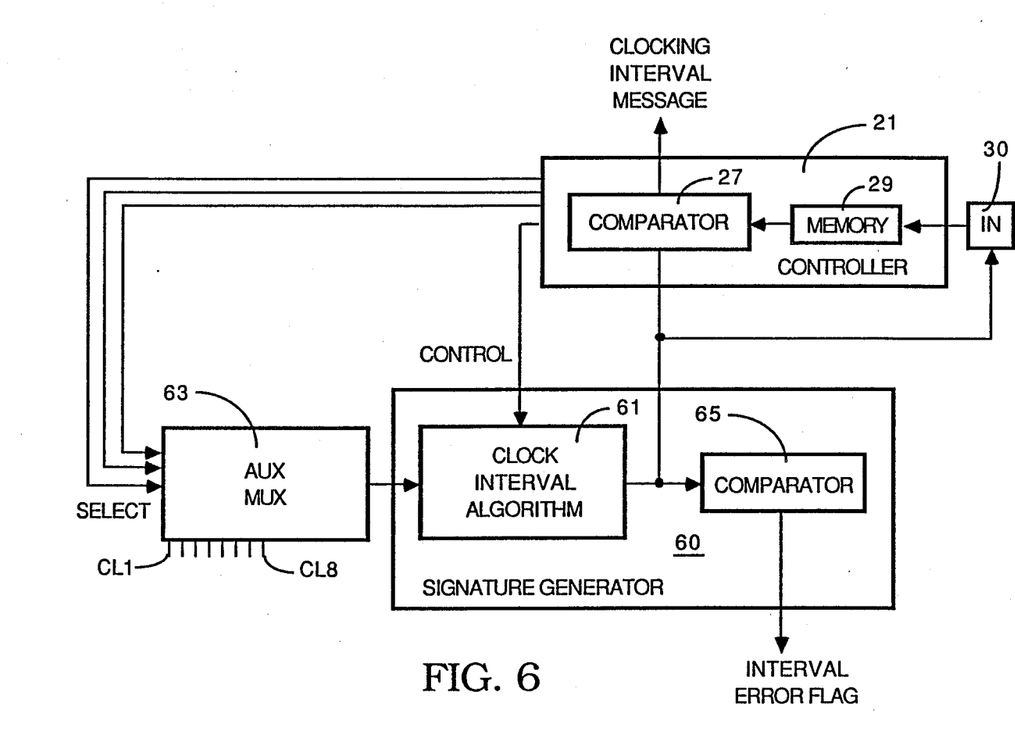
FIG. 6 is a generalized functional diagram of a system according to the present invention for analyzing clocking intervals during operation of digital electronic circuits.

FIG. 6 shows a system for indicating the stability of clock intervals at test nodes. The system provides a signature generating circuit 60, preferably a single integrated circuit, which includes a clocking interval algorithm circuit 61 and a comparator 65. Algorithm circuit 61 is a pseudo-random number generator substantially similar to signature algorithm circuit 35 of FIG. 2. Also, comparator 65 is essentially the same as comparator 37 in FIG. 2.

As shown in FIG. 6, algorithm circuit 61 is connected to an auxiliary multiplexer 63 which, in turn, is connected to lines CL1-CL8 that carry streams of clock pulses from clock nodes in the circuits to be tested. Auxiliary multiplexer 63 is controlled by binary SELECT signals. In the illustrated embodiment, multiplexer 63 receives eight input lines CL1-CL8 and, therefore, three lines are provided for the SELECT signals. Algorithm circuit 61 is controlled by CONTROL signals that originate from control circuit 19 of FIG. 1 and that define the duration of test cycles.

Outputs from clocking interval algorithm circuit 61 of FIG. 6 are provided to comparator 27 and memory 29 in microprocessor-based controller 21. It should be understood that controller 21 in FIG. 6 is the same as controller 21 in FIG. 1. In controller 21, memory 29 is connected to receive information from input device 30 which, in turn, receives information either from an external source or from clock interval algorithm circuit 61. Within microprocessor-based controller 21, comparator 27 is connected to receive signature words from both clock interval algorithm circuit 61 and memory 29. In response to those inputs, comparator 27 provides a CLOCKING INTERVAL MESSAGE signal that indicates comparisons between the received signature words.

To initiate operation of the system of FIG. 6, streams of clock signals from selected clock nodes are sent to auxiliary multiplexer 63. For example, clock signals from a first test node are conveyed to multiplexer 63 on line CL1, clock signals from a second test node are conveyed on line CL2, and so forth. Multiplexer 63 in this system operates as a line selector to select each of the lines CL1-CL8 in a predetermined order at times determined by the SELECT signals and sends the streams of clock signals from the selected lines to algorithm circuit 61. In practice, algorithm circuit 61 is actuated by the rising edges of clock pulses, but falling edges can also be used. The duration of the clocking test intervals is determined by the STOP and START signals. Clocking interval algorithm circuit 61, in operation, generates signature words that characterize the number of clock edges in a stream of clock signals during a predetermined test interval. It should be understood that algorithm circuit 61 does not directly count clock pulse edges but, instead, signaturizes streams of the edges to provide signature words unique to the numbers of edges in the streams. Thus, operation of clocking interval algorithm circuit 61 is analogous to operation of algorithm circuit 35 of FIG. 2 which signaturizes streams of binary data signals. After each signature word is generated by algorithm circuit 61, the signature word is sent to comparator 65 for comparison with the immediately previously generated signature word. That is, in this mode of operation, comparator 65 determines whether clocking intervals are consistent from period to period in real time. If the comparisons indicate that consecutive signature words are the same, the clocking intervals can be said to be stable; if the comparisons indicate that consecutive signature words are not the same, instability of the clocking intervals is indicated by the INTERVAL ERROR FLAG signal.

Further in operation of the system of FIG. 6, signature words generated by clocking interval algorithm circuit 61 can be sent to comparator 27 to check for correctness of the signature words. At comparator 27, comparisons are made between signature words provided by an algorithm circuit 61 and signature words stored in memory 29. The results of the comparisons are displayed as CLOCKING INTERVAL MESSAGE signals.

In one mode of operation of the system of FIG. 6, the signature words stored in memory 29 characterize clocking intervals at nodes of correctly operating circuits of the same kind as the one under test. In another mode of operation, the signature words stored in memory 29 are ones generated by algorithm circuit 61 itself during a learning interval. The signature word comparisons in either mode of testing are usually aperiodic because the rates at which signature words are generated for the streams of clock edges are usually faster than the rate at which controller 21 is able to obtain signatures for comparison purposes.

Figure 7:
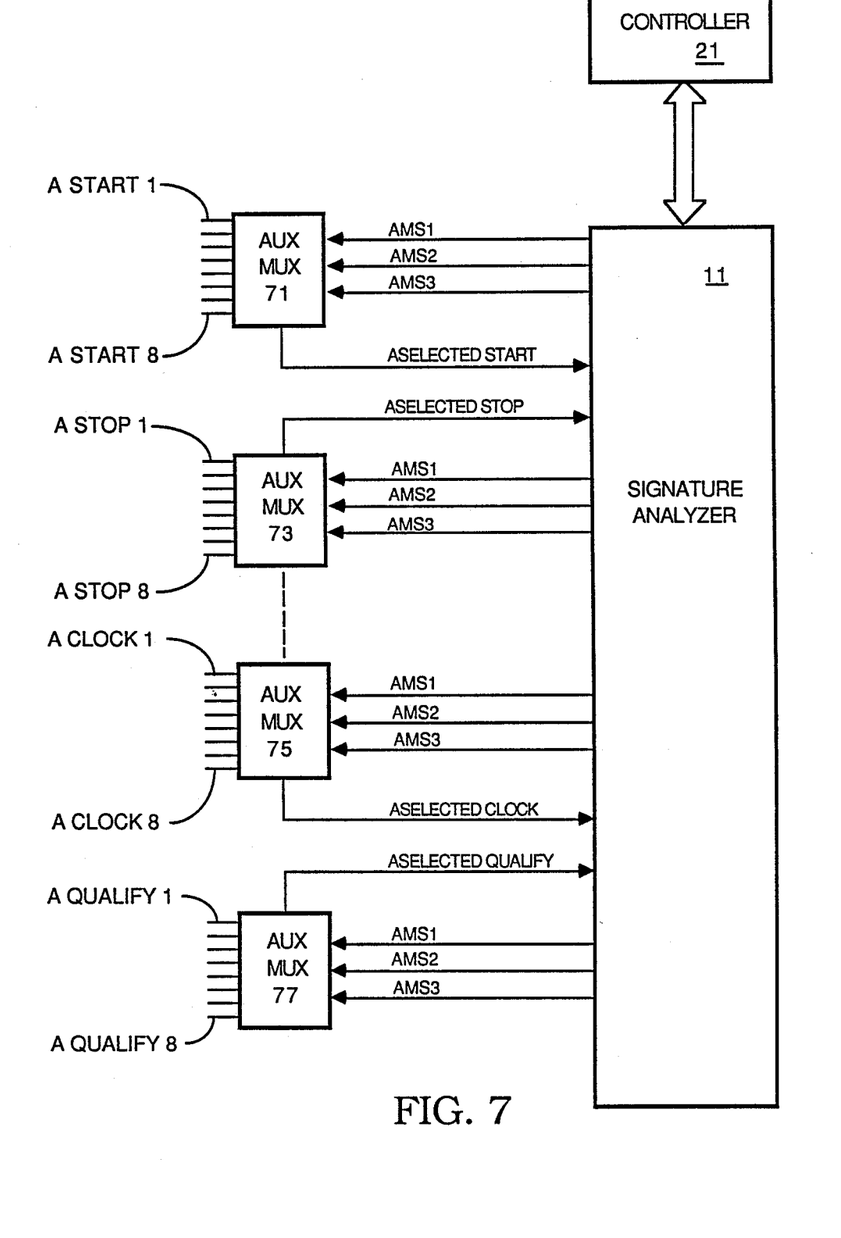
FIG. 7 is a functional diagram of an auxiliary system for use with the present invention.

FIG. 7 shows a system for selecting the duration of testing intervals for streams of signals from data nodes of the circuitry under test. In FIG. 7, an auxiliary multiplexer 71 is connected to receive a plurality of start signals on input lines designated ASTART1 through ASTART8. Auxiliary multiplexer 71 also receives select signals on input lines designated AMS1, AMS2, AND AMS3 originating from signature analyzer 11. The output of multiplexer 71 is ASELECTED START signal that is sent to signature analyzer 11. In operation of the system of FIG. 7, binary signals are provided on the select lines to determine the active inputs for auxiliary multiplexers 71, as well as for auxiliary multiplexers 73, 75 and 77.

As further shown in FIG. 7, another auxiliary multiplexer 73 is connected to receive select signals on lines AMS1-AMS3 and a plurality of stop signals on lines designated ASTOP1 through ASTOP8. The output signal from multiplexer 73 is designated ASELECTED STOP and is sent to signature analyzer 11. The combined operation of auxiliary multiplexers 71 and 73 will now be explained.

In practice, the eight ASTART and ASTOP input signals to multiplexers 71 and 73, respectively, are periodic trains of generally rectangular pulses. Generally, the periods of the ASTART signals in each of the trains are different from one another and, likewise, the periods of the ASTOP signals in each of the trains are different. For example, the periods between pulses in the train comprising the signals on the ASTART1 line can be relatively long compared to the periods between pulses on the ASTART8 line. In each train of signals, however, the periods are constant and, normally, all of the signals in a train are synchronized by a master clock. Taken together, a selected pair of ASTART and ASTOP signals provides the CONTROL signal shown in FIG. 6, and the period between selected START and STOP signals defines the testing intervals, or cycles, for the data nodes. The intervals are normally selected to be appropriate to the characteristics of the signal streams provided to the particular data nodes under test. For example, if a particular data node provides a relatively rapid stream of data signals, an appropriate testing interval for that node will usually be relatively short; on the other hand, if a node provides a relatively slow stream of data signals, an appropriate testing interval for that node will usually be relatively long.

As further shown in FIG. 7, two other auxiliary multiplexers 75 and 77 are connected to receive the ASM-1-ASM3 signals. Multiplexer 75 is also connected to receive clocking input signals on lines ACLOCK1 through ACLOCK8. The binary signals on the select lines determine the active input line. The ACLOCK signals on the input lines are normally trains of periodic pulses, and the periods of pulses normally differ on each of the lines. For a selected input line, multiplexer 75 provides the output signal designated ASELECTED CLOCK.

As also shown in FIG. 7, multiplexer 77 is connected similarly to multiplexer 75 except that it receives input signals on lines designated AQUALIFY1 through AQUALIFY8. Here again, the selection of an input line is determined by binary signals on lines AMS1-AMS3. For a selected input line, multiplexer 77 provides the output signal designated ASELECTED QUALIFY.

At this juncture, numerous advantages of the above-described systems can now be appreciated. Foremost is that the systems operate under software control to automatically analyze information from a plurality of nodes in digital electronic circuitry through data compression techniques without the necessity of manual probing. Moreover, the results of analysis and other information can be automatically stored for future use and reference. In practice, the stored information includes data node setups, and clocking interval signature and data signature information. This information can be used, for example, for fast diagnostics during system wakeup. It is also an advantage of the above-described systems that several diagnostics are available for each circuit tested. The diagnostics include correct signature verification, real-time data stability checks, clock interval verification, clock interval stability checks and other various status messages. The diversity of the diagnostics substantially aid in isolating and identifying circuit faults.

It should now be appreciated that the abovedescribed systems permit manual testing of nodes that are not permanently connected to a signature analyzer. In such cases, a technician can use manual jumper cables to connect one or more selected nodes to one of the auxiliary multiplexers as shown in FIG. 5. Having jumpered a selected node, analysis can proceed just as if the test nodes were hard-wired to the analysis systems.

Although the present invention has been described with particular reference to preferred embodiments, such disclosure should not be interpreted as limiting. For example, although signature generation has been emphasized, the signature word generator could be any data compression algorithm that generate alphanumeric designations that uniquely characterize streams of binary signals. As another example, workers skilled in the art will recognize that the clocking interval algorithm generator can also be used to signaturize streams of QUALIFY signals over predetermined test cycles. Still further, because of the flexibility afforded by microprocessor control of the systems, generated data can be stored and manipulated for future cognizance, warning flags, and messages in addition to those described above. These and other equivalents will no doubt become apparent to those skilled in the art after having read the preceding disclosure. It is intended that the appended claims be interpreted as covering all alternative embodiments and equivalents as fall within the spirit and scope of the present invention.

What is claimed is:

1. A system for testing digital electronic circuits comprising:
   generator means integrated with circuits to be tested for generating words that are unique to identical streams of binary signals;
   connecting means that connect the generator means to receive binary signals from a plurality of nodes in the digital circuit to be tested such that the generator means is simultaneously provided with bit streams from more that two nodes of the plurality of nodes; and
   comparator and storage means for receiving, storing and comparing consecutively-generated signature words.

2. A system for testing the stability of streams of binary signals at multiple nodes in electronic digital circuits comprising:
   generator means connected for receiving binary bit streams simultaneously from at least two nodes and operative for producing signature words unique to identical streams of binary signals;
   selector means that connect the generator means to receive streams of binary signals from at least two nodes in the digital circuit to be tested;
   comparator means that receive and compare consecutive signature words generated by the generator means; and
   means responsive to the comparator means for indicating the presence and absence of identity between consecutively-generated signature words.

3. A system according to claim 2 further including counter means responsible to the comparator means to count the number of consecutive identical signature words generated by the generator means.

4. A system according to claim 2 wherein the connecting means comprises a multiplexer means that receives the bit streams from the nodes and directs the streams sequentially to the generator means.

5. A system for detecting the stability of clock intervals in streams of clocking signals in digital electronic circuits comprising:

generator means connected to the nodes of a circuit under test to generate signature words unique to identical streams of edges of clock signals;

comparator means connected to the generator means for comparing consecutive signature words generated by the generator means; and means connected to the comparator means for indicating lack of identity between consecutively-generated signature words and, thereby for indicating whether clocking intervals are stable.

6. A system according to claim 5 further including memory means that stores signature words for comparison with the signature words generated by the signature generator means.

7. A process for testing digital electronic circuitry with an integral signature analyzer comprising the steps of:

from a plurality of nodes of the circuit to be tested, directing simultaneous streams of binary data to a signature generator;

generating signature words that are unique to identical streams of binary data;

comparing generated signature words with signature words that are stored in a memory device;

comparing consecutively-generated signature words; and indicating the presence and absence of identity between compared signature words.

8. A process according to claim 7 including the step of counting the number of consecutive signature words that are identical.

9. A process according to claim 17 wherein, after an indication is obtained that two consecutive signature words are different, streams of binary data are directed to the signature analyzer serially and sequentially from nodes to be tested.

10. A process according to claim 22 including the steps of obtaining signature words from nodes of a correctly operating circuit of the same kind as the one under test, and storing the obtained signature words in an external memory device.

11. A process for testing the stability of clocking intervals in digital electronic circuits comprising the steps of:

directing streams of clocking pulses to a signature analyzer;

generating signature words that are unique to identical streams of clocking pulses;

comparing consecutively-generated signature words; and indicating the presence and absence of identity between consecutive signature words.

12. A process according to claim 11 further including the steps of comparing generated signature words with signature words that are generated from correctly operating circuits of the same kind as the one under test.

13. A system for testing digital electronic circuits comprising:

generator means integrated with circuits to be tested and selectively connectable for generating signature words in response to edges of clocking signals, which words are unique to identical streams of binary signals;

connecting means that connect the generator means to receive binary signals from a plurality of nodes in the digital circuit to be tested; and comparator means connected to receive and compare signature words generated by the generator means with stored signature words to indicate the stability of clocking intervals for the circuits being tested.

* * * * *

UNITED STATES PATENT AND TRADEMARK OFFICE
CERTIFICATE OF CORRECTION

PATENT NO. : 4,897,842

DATED : January 30, 1990

INVENTOR(S) : William S. Herz/Robert A. Williams

It is certified that error appears in the above-identified patent and that said Letters Patent is hereby corrected as shown below:

Col. 13, Line 35 - claim 17 should read claim 7

Col. 14, Line 3 - claim 22 should read claim 7

Signed and Sealed this

Seventh Day of September, 1993

*Attest:*

BRUCE LEHMAN

*Attesting Officer                   Commissioner of Patents and Trademarks*